United States Patent [19]

Bean et al.

[11] Patent Number: 4,508,736

[45] Date of Patent: Apr. 2, 1985

[54] METHOD FOR PREPARING IMPROVED QUALITY RICE-CONTAINING BAKED PRODUCTS

[75] Inventors: Maura M. Bean; Kazuko D. Nishita, both of Berkeley; Elizabeth A. Hoops, San Jose, all of Calif.

[73] Assignee: The United States of America as represented by the Secretary of Agriculture, Washington, D.C.

[21] Appl. No.: 423,404

[22] Filed: Sep. 24, 1982

[51] Int. Cl.$^3$ ............................................. A21D 8/02
[52] U.S. Cl. .................................... 426/19; 426/551; 426/622
[58] Field of Search ............... 426/549, 618, 622, 551, 426/456, 463, 19

[56] References Cited

FOREIGN PATENT DOCUMENTS 70452  6/1979  Japan ................................... 426/557

OTHER PUBLICATIONS

Sanchez, Varietal Influence on the Quality of Philippine Rice Cake (Puto) Philip. Agric. 58 (9/10) 376–382.
U.S. Department of Agriculture, "Baking for People with Food Allergies", Home and Garden, Bulletin No. 147, 1975.

*Primary Examiner*—Raymond Jones
*Assistant Examiner*—Elizabeth A. King
*Attorney, Agent, or Firm*—M. Howard Silverstein; David G. McConnell; Margaret A. Connor

[57] ABSTRACT

Rice flour obtained from medium and/or short grain rice is hydrated with water under selected conditions to improve baking performance and obtain improved quality rice-containing baked products. A novel formulation to prepare a rice flour layer cake free of wheat, milk and eggs is disclosed.

4 Claims, No Drawings

METHOD FOR PREPARING IMPROVED QUALITY RICE-CONTAINING BAKED PRODUCTS

BACKGROUND OF THE INVENTION

1. Field of the Invention

The invention relates to and has among its objects a simple and inexpensive treatment of rice flour to obtain rice-containing baked goods having improved properties. Further objects and advantages of the invention will be evident from the following description wherein parts and percentages are by weight unless otherwise specified.

2. Description of the Prior Art

Rice has characteristics such as the absence of gluten; low levels of sodium, protein, fat, and fiber; and a high level of easily digested carbohydrates, which make it desirable for certain special diets. Baked products prepared with significant quantities of rice flour provide an important dietary addition to persons with wheat or gluten allergies, hypertension, nephritis, or digestive difficulties. The availability of baked products containing significant amounts of rice flour in place of wheat flour has been limited due to the difficulty of obtaining products which are acceptable to consumers.

The problems associated with producing baked products such as layer cakes, muffins or cupcakes having desirable volume, crumb character, grain, texture, appearance and eating quality from formulations using rice flour are due mainly to the lack of ability of the rice flour to form a gel. This is due to the extremely small size and and nature of the starch granules and the inability of the protein to form a structural network. These problems increase where wheat flour is completely replaced with rice flour, and eggs and milk, ingredients also helpful to cake structure, are left out of the formulation. Presently, cakes produced with significant quantities of rice flour are dense, gummy and/or pasty and have limited consumer acceptance. No method exists for producing a 100 percent rice flour, egg-free layer cake that is not dense or gummy and which has good grain, texture, appearance and eating quality.

SUMMARY OF THE INVENTION

We have discovered a simple and inexpensive method for treating rice flour with water to obtain flour which has improved baking performance and which produces baked products having improved properties such as volume, texture, grain, color, appearance, and eating quality over baked goods prepared from untreated rice flour.

In accordance with our invention, rice flour obtained from medium or short grain rice is mixed with water; then the rice flour-water mixture is held at a temperature of about $-25°$ to $77°$ C. for a period of time sufficient to hydrate the particles and obtain rice flour with improved baking performance and insufficient to cause undesirable bacterial growth in the mixture or cause undesirable heat deterioration of the flour. The treated flour is suitable for direct use in a baking formulation or can be dried for use at a later time.

Surprisingly, this simple treatment improves the rice flour performance. With our invention, chemically-leavened baked goods such as layer cakes, cupcakes and muffins having good volume, grain, texture, appearance and eating quality can be prepared from formulations in which all or most of the wheat flour has been replaced by rice flour of the invention. A novel formulation to prepare a layer cake free of wheat, milk and eggs, using the so-treated flour is disclosed. Yeast-leavened bread prepared with 100 percent rice flour has improved tensile strength if the rice flour is treated according to our invention prior to incorporation into the bread formulation.

Because the method of the invention does not require intensive labor or capital expenditure, it is suitable for home use as well as commercial applications.

DETAILED DESCRIPTION OF THE INVENTION

Rice flour useful in the instant invention is the product obtained from the milling of medium and/or short grain rices grown in the United States or the equivalent thereof. Flours from long grain rices will not give the same performance whether untreated or treated by this invention. The physicochemical characteristics typical of U.S. medium/short grain rices which are important in the flour for baking applications are low amylose content (generally below 20 percent) and low gelatinization temperature (generally below 65° C.). These properties are described more fully by Nishita and Bean in *Cereal Chemistry*, Volume 56, pp. 185–189 (1979). Worldwide these characteristics may not be as uniformly associated with rice kernel grain length as they are in the United States (Simpson et al., *Technical Bulletin No.* 1331, ARS, United States Department of Agriculture, Washington, D.C. October 1965).

HYDRATION OF RICE FLOUR

Rice flour is treated according to the following process to obtain the improved baking flour of the invention:

(a) rice flour ground from whole or broken rice kernels is mixed with an amount of water and for a time sufficient to wet all the particles; and (b) the rice flour mixture of step a is held at a temperature of about $-25°$ C. to $77°$ C. and preferably $4°$ C. to $60°$ C. for a period sufficient to hydrate the flour to obtain rice flour having improved baking performance and insufficient to cause undesirable microbial growth or undesirable heat deterioration of the flour.

The proportion of rice flour to water can be varied over a wide range. The minimum amount of water is that amount sufficient to wet the flour. Generally, the proportion of rice flour to water will be in the range of 100 parts rice flour/30 parts water to 100 parts rice flour/300 parts water. Where the treated flour is used directly in a baking formulation, the desirable proportion of flour to water is that which is close to the desired ratios of rice and water in the batter to be made from the hydrated flour. This avoids time and energy in removing surplus moisture prior to processing. Alternatively, the treated flour may be dried for later use.

The rice flour treatment to obtain improved baked goods is related to hydration of the flour over time. Three parameters are significant and interdependent in the treatment: (1) intensity of mixing; (2) temperature during the holding step and (3) length of hydration time. The mixing required in the method of the invention is that sufficient to wet all the flour particles. It may be a simple blending to incorporate the rice flour with the water or it may be a vigorous mixing. When mixing is held to a minimum, longer hydration time is required to obtain improved quality products. The temperature of hydration ranges from about −25° C. (that is, storage in a freezer) to about 77° C. The preferred temperature range is about 4° C. to 60° C.

As described above, the holding time required to sufficiently hydrate the rice flour so that improved baked products are obtained varies. In general, when mixing is vigorous (e.g., in a mixer for 5 min—1 min at low speed and 4 min at high speed), the minimum hydration time to obtain improved quality baked goods is about 2 weeks in a freezer (−25° C.), 12 hours in a refrigerator (4° C.), 5 hours at room temperature (22° C.), 3 hours at 32° C. and 1 hour at 77° C. In baking tests using layer cakes prepared from a formulation free of wheat, eggs and milk as described in detail below, excellent volume was obtained when rice flour and water (100 parts flour/80 parts water) were mixed 3 min (1 min at low speed and 2 min at high speed) at room temperature (22° C.) followed by the immediate addition of the other ingredients in the formulation. However, the desired golden brown crust color was not achieved unless the flour-water mixture was held for the longer times as described above. When the flour and water were mixed together 1 min at low speed followed by the addition of the other ingredients in the formulation, the cakes obtained showed only a small increase in volume and no color development. If the same flour-water mixture was held 24 hours at 22° C., the product obtained had excellent volume, texture and color.

In contrast, the holding time must not be so long as to cause undesirable microbial growth which results in off-flavors, mold or poor sanitation or to cause undesirable heat deterioration of the flour components. Typically, for a rice flour-water mixture containing about 700 grams of rice flour, the maximum holding time should be no more than 18 hours at 32° C. or 2 hours at 77° C. At refrigerator temperatures (4° C.), the holding time may be increased to 96 hours without causing deleterious microbial growth.

USES OF RICE FLOUR OF THE INVENTION

The rice flour obtained by the method of the invention may be used in a variety of baking formulations to produce bread, cakes, muffins, cupcakes and the like having improved properties over baked goods prepared from untreated rice flour.

We have devised a novel rice-containing cake formulation free of wheat, eggs, and milk for use with untreated (dry) rice flour or rice flour hydrated according to the method of the invention. The ingredients and composition thereof to prepare two 6-inch layers are as follows:

| Ingredients | Quantity, g | Composition, parts (Flour Basis) |
|---|---|---|
| Rice flour | 227 | 100 |
| Water | 182 | 80 |
| Sugar | 182 | 80 |
| Shortening or oil | 34 | 15 |
| Baking powder | 12-16 | 5-7 |

Optimum levels of water can be varied between about 70 and 90 parts to every 100 parts of flour.

Procedure using untreated flour: the sugar, baking powder and flour are sieved and blended together in a mixing bowl. The water and oil are added to the dry ingredients and mixed at low speed for 1 minute followed by scraping of the bowl, 4 minutes at high speed followed by scraping of the bowl and 4 minutes longer at high speed. The batter is transferred to the prepared pans and baked at 177° C. (350° F.) for 32 minutes. The rice cake produced by this procedure has a pale crust color, low but adequate volume and a somewhat pasty, dense texture.

Procedure using hydrated flour: rice flour is mixed with the water and hydrated as described previously prior to the addition of the other ingredients. Cakes prepared from hydrated rice flour have improved golden brown crust color, appearance, volume, texture and eating quality. Although replacement of sucrose in the cake formula with 2 to 4 percent glucose will provide crust color improvement in cakes baked with untreated flour, glucose is not a common ingredient in household baking or in commercial applications for baked products for the allergic consumer. Furthermore, glucose additions do not improve volume, texture or eating quality of the cake.

Good quality baked products may also be prepared using rice flour treated according to the method of the invention in combination with dry milk, eggs and other additives such as soy flour, isolated oilseed protein and the like which increase protein content and nutritional value. Rice-containing baked goods prepared from the so-treated flour of the invention are useful as a dietary addition for persons suffering from celiac disease, allergies or other health problems requiring the restriction of wheat.

This improvement of rice flour performance by hydration of the rice under selected conditions to produce baked goods having improved properties was not anticipated. Although some traditional rice dishes have been prepared by soaking rice flour or kernels to a naturally fermented, dense, sour testing product, none of these rice dishes suggested that hydration would improve rice flour baking performance so as to produce cakes or other chemically-leavened baked goods which are light, high in volume, and not gummy and which have fine cell structure, improved appearance and eating quality. Nor was it anticipated that such hydration would produce rice flour yielding yeast-leavened baked goods having improved tensile strength.

It is not known exactly what the hydration does to the rice flour. It appears that the treatment in some way modifies the rice flour starch and protein to produce improved flour performance during baking; however, electrophoresis of rice flour extract by SDS-PAGE failed to show differences in gel patterns of treated and untreated rice flour proteins. Development of reducing sugars during hydration may account for product color improvement, but does not account for improvement of other quality characteristics. No change in the starch granules was observed under the microscope in flour hydrated at temperatures below 60° C. When the treatment temperature was close to the initial gelatinization temperature of the starch (e.g., about 60° C.) some swelling and loss of birefringence of the starch were observed; this may be advantageous to crumb structure. If hydration is carried out in the presence of sugar, the improved flour performance does not occur.

EXAMPLES

The invention is next described with the following illustrative examples. These are by way of illustration and not limitation.

EXAMPLE 1

Hydration of Rice Flour for Layer Cakes

Three mixtures were prepared as follows: To 700 g rice flour obtained from medium/short grain rice were added 560 g water (100 parts rice flour/80 parts water). The mixture was mixed at room temperature (22° C.) on a Hobart C-100 mixer 5 min (1 min at speed 1 (low speed) followed by scraping of the bowl, and 4 min at speed 3 (high speed)). Each mixture was covered and stored under one of the following conditions:

A. at 4° C. for 22 hours followed by room temperature (22° C.) for 2 hours;
B. at room temperature (22° C.) for 24 hours; or
C. at 32° C. for 22 hours followed by room temperature (22° C.) for 2 hours.

EXAMPLE 2

Preparation of Layer Cakes Free of Wheat, Eggs and Milk Using Hydrated Rice Flour To 700 g of rice flour hydrated with 560 g water as described in Example 1, A, B or C, were added 560 g sugar (80 parts), 105 g oil (15 parts) and 35 g baking powder (5 parts). The mixture was mixed a total of 9 min using a Hobart C-100 mixer (1 min at speed 1 followed by scraping of the bowl; 4 min at speed 3 followed by scraping and 4 min at speed 3). 300 g of batter was poured into each of 6 pans. The cakes were baked at 177° C. for 32 minutes. Six 6-inch layer cakes were obtained.

EXAMPLE 3

Preparation of Layer Cakes Free of Wheat, Eggs and Milk Using Untreated Rice Flour Two hundred twenty-seven g of rice flour (100 parts), 12 g of baking powder (5 parts) and 182 g of sugar (80 parts) were blended in a 3-quart mixing bowl; 182 g of water (80 parts) and 34 g of oil (15 parts) were added; and the mixture mixed a total of 9 min using a Hobart C-100 mixer as described in Example 2. The cakes were baked at 177° C. for 32 minutes. Two 6-inch layer cakes were obtained.

EXAMPLE 4

Comparison of Eating Quality and Appearance of Cakes Prepared with Treated and Untreated Rice Flour Panels were held to judge the appearance and eating quality of cakes prepared with rice flour hydrated according to the method of the invention as described in Example 1 (Treatments A, B, and C) as compared to cakes prepared from untreated rice flour. Cakes were prepared as described in Examples 2 and 3. Cakes were presented as slices with crusts removed. Panelists were asked to judge the treated and control samples on a hedonic scale of 1–9 for overall eating quality (9=like extremely; 1=dislike extremely) and preference. Cakes were also presented as half cakes with crust intact for judgment of cake appearance. Panels were held in the morning and afternoon. Judgement of each treatment was replicated once at a different time (AM/PM) from the first judgement.

Cake Appearance: Cakes from rice flour held at 32° C. during hydration were preferred over untreated samples in every case. Cakes made from hydrated rice flour held at room temperature had preference values of 95–100 percent. Cakes made from hydrated flour held in the refrigerator (4° C.) had preference values of 85–100 percent. Hedonic values of treated samples were higher than for the untreated samples. The results are tabulated in Table I.

Cake Eating Quality and Appearance: Taste tests were carried out on a slice of cake with crust intact. Cakes prepared from rice flour treated according to Example 1 held at room temperature (22° C., medium treatment) had eating quality preference values of 79–88 percent and appearance preference values of 100 percent. Hedonic values were higher for treated samples. The results are tabulated in Table II.

TABLE I

RICE LAYER CAKE APPEARANCE
HIGH, MEDIUM AND LOW TEMPERATURE TREATMENTS

| Temperature of Treatment | No. of Judgments | Rating on Hedonic scale[a] Treated[b] | Untreated[c] | Prefer Treated[b] | Prefer Untreated[c] | No Preference | % Preferring Treated[d] |
|---|---|---|---|---|---|---|---|
| HIGH (32° C.) | | | | | | | |
| Rep. 1 (PM) | 22 | 7.5 | 5.0 | 22 | — | — | 100 |
| Rep. 1 (AM) | 23 | 7.8 | 5.1 | 22 | — | 1 | 100 |
| TOTAL/AV. | 45 | 7.6 | 5.0 | 44 | — | 1 | 100 |
| MEDIUM (22° C.) | | | | | | | |
| Rep. 1 (AM) | 22 | 7.5 | 5.3 | 20 | 1 | 1 | 95 |
| Rep. 2 (PM) | 23 | 7.5 | 5.2 | 23 | — | — | 100 |
| TOTAL/AV. | 45 | 7.5 | 5.2 | 43 | 1 | 1 | 98 |
| LOW (4° C.) | | | | | | | |
| Rep. 1 (AM) | 21 | 6.8 | 5.2 | 17 | 3 | 1 | 85 |
| Rep. 2 (PM) | 22 | 7.2 | 5.1 | 21 | — | 1 | 100 |
| TOTAL/AV. | 43 | 7.0 | 5.2 | 38 | 3 | 2 | 93 |

[a] 9 = Like extremely; 1 = Dislike extremely.
[b] In accordance with the invention.
[c] Not in accordance with the invention.
[d] Those with no preference were not counted.

TABLE II

RICE LAYER CAKE
MEDIUM TREATMENT ONLY

| Treatment | Rating on Hedonic Scale[a] | | | Preference Value | | | |
|---|---|---|---|---|---|---|---|
| | No. of Judgments | Treated[b] | Untreated[c] | Prefer Treated[b] | Prefer Untreated[c] | No Preference | % Preferring Treated[d] |
| EATING QUALITY: | | | | | | | |
| Rep. 1 (AM) | 24 | 7.4 | 6.3 | 21 | 3 | — | 88 |
| Rep. 2 (PM) | 24 | 7.1 | 6.1 | 19 | 4 | 1 | 79 |
| TOTAL/AV. | 48 | 7.2 | 6.2 | 40 | 7 | 1 | 84 |
| APPEARANCE: | | | | | | | |
| Rep. 1 (AM) | 24 | 7.6 | 5.7 | 24 | — | — | 100 |
| Rep. 2 (PM) | 24 | 7.6 | 5.7 | 24 | — | — | 100 |
| TOTAL/AV. | 48 | 7.6 | 5.7 | 48 | — | — | 100 |

[a] 9 = Like extremely; 1 = Dislike extremely.
[b] In accordance with the invention.
[c] Not in accordance with the invention.
[d] Those with no preference were not counted.

EXAMPLE 5

Volume and Texture of Layer Cakes as a Function of Rice Flour-Water Holding Time and Temperature Volumes were measured on cakes prepared from rice flour mixed with water prior to the addition of the other ingredients (treated flour) and cakes prepared by a conventional method wherein the flour is mixed with the dry ingredients prior to the addition of the liquid ingredients (untreated flour).

The treated flour was processed as follows: to 700 g (100 parts) of medium/short grain rice flour were added 560 g (80 parts) of water. The mixture was mixed for five minutes as described in Example 1. The mixture was held for varying amounts of time at five temperatures. Cakes were prepared using the formulation described in Example 2 with the exception that 16 g (7 parts) of baking powder were used.

The control cakes (untreated flour) were prepared according to Example 3 except that 16 g (7 parts) of baking powder were used.

Volumes were measured using the rapeseed displacement method. Cakes prepared with treated flour showed increases in volume in all cases except when held at 77° C. for 4 hours. The results are tabulated in Table III.

Texture was evaluated by expert bakers. Improvement in texture was noted when rice flour mixed with water (100/80) for 5 min as described above was held the following times and temperatures: 5 weeks at −25° C.; 12 hours at 4° C.; 6 hours at 22° C.; 6 hours at 35° C. and 1 hour at 77° C.

TABLE III

| | | LAYER CAKE VOLUME, cc | | | | |
|---|---|---|---|---|---|---|
| | Holding | Storage Temperature, °C. | | | | |
| Flour | Time | −25 | 4 | 22 | 35 | 77 |
| Treated | 0 hours | 560 | 550 | 550 | 555 | 540 |
| | 1 hours | | | | 570 | 535 |
| | 2 hours | | 560 | 570 | 590 | 590 |
| | 4 hours | | 550 | 580 | 595 | 595 |
| | 6 hours | | 565 | 580 | 595 | |
| | 12 hours | | 560 | 595 | | |
| | 18 hours | | | | 595 | |
| | 24 hours | | 560 | | | |
| | 2 weeks | 570 | | | | |
| | 5 weeks | 570 | | | | |
| Untreated | None | 480 | 485 | 480 | 495 | 490 |

Having thus described our invention, we claim:

1. A method for preparing improved quality rice-containing chemically-leavened or yeast-leavened baked products wherein all or most of the wheat flour in the baking formulation has been replaced with rice flour, which comprises the steps of:
   (a) mixing rice flour having an amylose content below 20% and a low gelatinization temperature with an amount of water and for a time sufficient to wet all the particles;
   (b) holding the rice flour-water mixture at a temperature of about −25° C. to 77° C. for a period sufficient to hydrate the particles and insufficient to cause undesirable microbial growth in the mixture or cause undersirable heat deterioration of the flour;
   wherein steps (a) and (b) are performed in the absence of added sugar; and
   wherein the intensity of the mixing of step (a) and the holding time and temperature of step (b) are interrelated as follows:
   if the mixing of step (a) is vigorous, the minimum holding time is shorter than for a simple blending; and for a given mixing intensity, the minimum holding time is longer at the lower temperatures than at the higher temperatures;
   (c) mixing the treated rice flour of step (b) into a baking formulation; and
   (d) baking the formulation of step (c).

2. The method of claim 1 wherein the baking formulation is free of wheat, milk, and egg.

3. The method claim 2 wherein the baked products are chemically-leavened cakes.

4. In a method of preparing chemically-leavened or yeast-leavened baked products wherein most or all of the wheat flour has been replaced with rice flour wherein a baking formulation is mixed and baked; the improvement comprising treating the rice flour prior to the addition to the baking formulation to improve baking performance so as to obtain improved quality baked goods, the treatment comprising the steps of:
   (a) mixing rice flour having an amylose content below 20% and a low gelatinization temperature with an amount of water and for a time sufficient to wet all the particles; and
   (b) holding the rice flour-water mixture at a temperature of about −25° C. to 77° C. for a period sufficient to hydrate the particles and obtain rice flour with improved making performance and insufficient to cause undesirable microbial growth in the mixture or cause undersirable heat deterioration of the flour;

wherein steps (a) and (b) are performed in the absence of added sugar; and wherein the intensity of the mixing of step (a) and the holding time and temperature of step (b) are interrelated as follows if the mixing of step (a) is vigorous, the minimum holding time is shorter than for a simple blending; and for a given mixing intensity, the minimum holding time is longer at the lower temperatures than at the higher temperatures.

* * * * *

UNITED STATES PATENT AND TRADEMARK OFFICE
CERTIFICATE OF CORRECTION

PATENT NO. : 4,508,736
DATED : April 2, 1985
INVENTOR(S) : Maura M. Bean et al.

It is certified that error appears in the above—identified patent and that said Letters Patent is hereby corrected as shown below:

In column 2, line 36, delete "testing" and insert -- tasting --.

In Table III, column 7, line 60, delete "595" printed as the value for 4 hours at 77°C and insert -- 395 --.

Signed and Sealed this

Tenth Day of September 1985

[SEAL]

Attest:

DONALD J. QUIGG

Attesting Officer   Acting Commissioner of Patents and Trademarks - Designate